(12) United States Patent
Sze (10) Patent No.: US 11,083,268 B2
(45) Date of Patent: Aug. 10, 2021

(54) HAIR BARRETTES AND METHODS OF MANUFACTURE THEREOF

(71) Applicant: Tung Hing Plastic Manufactory Ltd., Kowloon (CN)

(72) Inventor: Ka Chuen Sze, Kowloon (CN)

(73) Assignee: Tung Hing Plastic Manufactory Ltd., Kowloon (CN)

( * ) Notice: Subject to any disclaimer, the term of this patent is extended or adjusted under 35 U.S.C. 154(b) by 714 days.

(21) Appl. No.: 15/833,512

(22) Filed: Dec. 6, 2017

(65) Prior Publication Data

US 2019/0075903 A1 Mar. 14, 2019

Related U.S. Application Data

(63) Continuation-in-part of application No. 29/617,614, filed on Sep. 14, 2017, now Pat. No. Des. 837,449.

(51) Int. Cl.
| | |
|---|---|
| *A45D 8/26* | (2006.01) |
| *A45D 8/32* | (2006.01) |
| *B29C 69/00* | (2006.01) |
| *B29C 65/00* | (2006.01) |
| *B29L 31/00* | (2006.01) |

(Continued)

(52) U.S. Cl.
CPC ............... *A45D 8/26* (2013.01); *A45D 8/32* (2013.01); *B29C 66/532* (2013.01); *B29C 66/54* (2013.01); *B29C 66/5414* (2013.01); *B29C 66/7392* (2013.01); *B29C 69/00* (2013.01); *A45D 8/004* (2021.01); *B29C 65/58* (2013.01); *B29C 65/606* (2013.01); *B29C 66/8322* (2013.01); *B29K 2995/007* (2013.01); *B29K 2995/0046* (2013.01); *B29L 2031/718* (2013.01)

(58) Field of Classification Search
CPC ............... A45D 8/34; A45D 2008/006; A45D 2008/004; A45D 8/32; A45D 8/26; Y10T 24/44291; Y10T 24/44479; Y10T 24/44436; Y10T 24/44376
USPC .......................................... 132/275; D28/42
See application file for complete search history.

(56) References Cited

U.S. PATENT DOCUMENTS

| | | | | |
|---|---|---|---|---|
| 5,259,405 | A | * | 11/1993 | Hua-Chou ............... A45D 8/24 132/278 |
| 5,365,955 | A | * | 11/1994 | Desgroux ............... A45D 8/34 132/278 |

(Continued)

*Primary Examiner* — Yogesh P Patel
*Assistant Examiner* — Jennifer Gill
(74) *Attorney, Agent, or Firm* — Heslin Rothenberg Farley & Mesiti P.C.; Melvin Li; Kristian Ziegler (57) ABSTRACT

A hair barrette is provided. The hair barrette has a decorative member defining an outwardly facing surface and an inwardly facing surface, and a closure device. The closure device includes a lever and first and second seat members arranged at opposite ends of the decorative member. One end of the lever is hingedly connected to the second seat member at which the lever is pivotably movably with respect to the decorative member. The closure device is provided with a bridge member raised from the inwardly facing surface of the decorative member and connecting the first and second seat members. The first and second seat members and the lever are made of a first plastic(s) material and the bridge member is made from a more flexible second plastic(s) material. The bridge member is made of polymeric material, has a hardness of Shore D30-70, and is extendible in length to 150-300%.

11 Claims, 8 Drawing Sheets

(51) Int. Cl.
  *B29C 65/58* (2006.01)
  *B29C 65/60* (2006.01)
  *A45D 8/00* (2006.01)

(56) References Cited

U.S. PATENT DOCUMENTS

| | | | | |
|---|---|---|---|---|
| 5,495,862 | A * | 3/1996 | Dewing | A45D 8/24 132/278 |
| 5,605,166 | A * | 2/1997 | Chou | A45D 8/30 132/275 |
| 5,722,437 | A * | 3/1998 | Chang | A45D 8/24 132/275 |
| 6,142,158 | A * | 11/2000 | Lloyd | A45D 8/24 132/275 |
| 7,766,020 | B2 * | 8/2010 | Chininis | A45D 8/26 132/278 |
| 9,049,914 | B2 | 6/2015 | Sze | |
| D836,838 | S * | 12/2018 | Sze | D28/43 |
| 2006/0162738 | A1 * | 7/2006 | Chudzik | A45D 8/24 132/278 |
| 2007/0062553 | A1 * | 3/2007 | Audoux | A45D 8/26 132/278 |
| 2014/0166040 | A1 * | 6/2014 | Sze | A45D 8/26 132/278 |
| 2016/0157576 | A1 * | 6/2016 | Beck | A45D 8/26 132/275 |

\* cited by examiner

HAIR BARRETTES AND METHODS OF MANUFACTURE THEREOF

CROSS REFERENCE TO RELATED APPLICATION

This application claims priority from earlier filed U.S. patent application Ser. No. 29/617,614 filed Sep. 14, 2017, contents thereof in its entirety are incorporated herein.

FIELD OF THE INVENTION

The present invention is concerned with improved barrettes and methods of manufacture of thereof.

BACKGROUND OF THE INVENTION

There are a variety of hair accessories for use in securing hair and/or providing decoration to a user. While different such accessories may be useful in achieving the objects of hair securement and decoration to some extent, many face one common problem of not being able to accommodate different volume of hair logs. Further, many such accessories are not able to secure hair sufficiently tight when needed and also not being able to be disengaged easily when not needed. In some conventional hair accessories, the structure tends to create areas such as gaps causing hair to get caught and hair breakage. In some other conventional hair accessories, the structure thereof or the process of manufacture thereof is simply too complicated, causing difficulties in making reliable hair securement and/or high cost of manufacture. Often, such accessories tend to be rather non-durable.

The present invention seeks to address these issues, or at least to provide an alternative to the public.

SUMMARY OF THE INVENTION

According to a first aspect of the present invention, there is provided a hair barrette comprising:
 a. a decorative member defining an outwardly facing surface and an inwardly facing surface, and
 b. a closure device for securing hair of a user;
 wherein:
 i) the closure device includes a lever, a first seat member and a second seat member, the first and second seat members arranged at and fixedly connected to the inwardly facing surface of opposite ends of the decorative member, respectively,
 ii) one end of the lever is hingedly connected to the second seat member at which the lever is pivotably movably with respect to the decorative member,
 iii) the closure device is provided with a bridge member raised from the inwardly facing surface of the decorative member and connecting the first and second seat members,
 iv) the first and second seat members and the lever are made of a first plastic(s) material and the bridge member is made from a second plastic(s) material more flexible than the first material.
 v) the bridge member is made of polymeric material and is extendible to 150-300% of its default length (i.e. increased by 50-200% in length), and has a hardness of Shore D30-70.

With this combination of features, and in particular the selected extendibility and elasticity characteristics, the hair barrette can balance the requirements of being able to accommodate different volume of hair logs to be secured and being able to secure the hair log sufficiently tightly. The extendibility is particular of importance when the inwardly facing surface of the decorative member has a concave surface with a large curvature. In this scenario, the extendibility can allow the bridge member to flex to a large extent to yield room for holding a log of hair between the bridge member and the closure device.

Preferably, the first material may be selected from the group consisting of acrylonitrile butadiene styrene (ABS), polypropylene (PP), Paraformaldehyde (POM), nylon, high impact polystyrene (HIPS), thermoplastic polyurethane (TPU), high-density polyethylene (HDPE), polyethylene terephthalate (PET), and polylactic acid (PLA). The second material may selected from the group consisting of silicone and thermoplastic elastomer. These material candidates are particularly suitable to achieving the selected extendibility and elasticity characteristics.

Suitably, the seat members may be secured to the inwardly facing surface by way of welding thereto. The inwardly facing surface may be provided with protrusions and bottom surface of first and second seat members may be provided with complementary recesses for receiving the protrusions whereby the welding at distal end of the protrusions fixedly secures the first and second seat members to the decorative member. The first and second seat members and the inwardly facing surface of the decorative member together may define a pair of slots for accommodating opposite distal ends of the bridge member, and the protrusions may be positioned to pass through and secure both the bridge member and the first and second seat members.

In an embodiment, the inwardly facing surface may have a concave profile, and wherein the hair barrette may comprise a pair of levelers connected to the inwardly facing surface on which the first and second seat members rest.

In one embodiment, the first seat member may be provided with a flexible upstanding portion slanted away from the first seat member and an end portion laterally or generally perpendicularly extending away from a distal end of the upstanding portion and acting as an actuator for controlling configuration of the closure device. The closure device may be adapted to assume a first configuration in which the actuator is depressed, and in the first configuration the lever is not locked to the first member and freely pivotably movable about the second seat member. The closure device may be adapted to assume a second configuration in which the actuator is allowed to return to a default, and in the second configuration the lever is locked to the first member such that hair to be tied is secured between the lever and the bridge member.

The closure device may be free of any metallic components.

According to a second aspect of the present invention, there is provided a method of making a hair barrette, comprising the steps of:
 a) forming a decorative member with an outwardly facing surface and an inwardly facing surface,
 b) forming a pair of seat members by injection molding,
 c) forming a bridge member by injection molding,
 d) assembling the decorative member, the seat members, and the bridge member with opposite distal ends of the bridge member positioned between the seat members and the decorative member,
 wherein
 i) the first and second seat members and the lever are made of a first plastic(s) material and the bridge member is made from a second plastic(s) material more flexible than the first material, and the bridge member is made of polymeric material and is extendible in length to 150-300% of its default length, and has a hardness of Shore D30-70.

Preferably, the first material may be selected from the group consisting of acrylonitrile butadiene styrene (ABS), polypropylene (PP), Paraformaldehyde (POM), nylon, high impact polystyrene (HIPS), thermoplastic polyurethane (TPU), high-density polyethylene (HDPE), polyethylene terephthalate (PET), and polylactic acid (PLA).

Suitably, the second material may be selected from the group consisting of silicone and thermoplastic elastomer.

Advantageously, the seat members may be secured to the inwardly facing surface by way of welding thereto. The inwardly facing surface may be provided with protrusions and a bottom surface of first and second seat members may be provided with complementary recesses for receiving the protrusions whereby the welding at distal end of the protrusions fixedly secures the first and second seat members to the decorative member. The first and second seat members and the inwardly facing surface of the decorative member together may define a pair of slots for accommodating opposite distal ends of the bridge member, and the protrusions may be positioned to pass through and secure both the bridge member and the first and second seat members.

In an embodiment, the inwardly facing surface may have a concave profile, and wherein the hair barrette may comprise a pair of levelers connected to the inwardly facing surface on which the first and second seat members rest.

In one embodiment, the first seat member may be provided with a flexible upstanding portion slanted away from the first member and an end portion laterally or generally perpendicularly extending away from a distal end of the upstanding portion and acting as an actuator for controlling configuration of the closure device.

The closure device may be adapted to assume a first configuration in which the actuator is depressed, and in the first configuration the lever is not locked to the first member and freely pivotably movable about the second seat member. The closure device may be adapted to assume a second configuration in which the actuator is allowed to return to a default, and in the second configuration the lever is locked to the first member such that hair to be tied is secured between the lever and the bridge member. The closure device may be free of any metallic components.

BRIEF DESCRIPTION OF THE DRAWINGS

Some embodiments of the present invention will now be explained, with reference to the accompanied drawings, in which.

DETAILED DESCRIPTION OF PREFERRED EMBODIMENTS OF THE INVENTION

The present invention is concerned with hair barrettes with a bridge member that can be significantly elongated and a method of manufacture thereof.

An embodiment of a hair barrette according the present invention is shown in FIGS. 1 to 9. The hair barrette, designated 2, has a generally elongate profile.

FIGS. 1 to 7 show the hair barrette in a locked configuration. The hair barrette 2 has an elongate decorative member 4 defining, in use, an outwardly facing surface 6 and an inwardly facing surface 8. The outwardly facing surface 6 has a convex profile while the inwardly facing surface 8 has a concave profile. The outwardly facing surface 6 is configured with aesthetically pleasant designs. The inwardly facing surface 8 is configured to connect with a closure device 10 for securing to a log of hair, details of which are further depicted in the following.

In this embodiment, the decorative member 4 is substantially larger than the closure device 10 such that in use the closure device 10 is concealed and out of sight. The length and the width of the closure member are about 7.5 cm and 1.3 cm, respectively. However, research and development leading to the present invention has shown that the workable length and width dimensions are 4-12 cm and 0.92-1.38 cm, respectively. Results have shown that the workable ratio of the width of the lip and the length of the lever should range from 0.92:12 to 1.38:4. When the lever is relatively long, the width of the lip cannot be too narrow or else the lever would accidently disengage from the continuous member. On the other hand, when the lever is relatively short, the width of the lip cannot be too large or else the lever would not be able to disengage from the continuous member sufficiently easily on depression. It is to be understood that the aforementioned dimensions and dimension ranges of the closure device 10 in the context of the present invention are not arbitrary but are arrived at after much research and development. Results from the research and development indicates that not any dimensions would work, and only some combinations of length and width in the context of closure devices (e.g. 10) according to the present invention would allow the hair barrette 2 to operate in a workable, reliable and effective manner. The degree of importance of the dimensional characteristics of the closure device 10 will become more apparent after the other characteristics are explained in the following.

Figure 1:
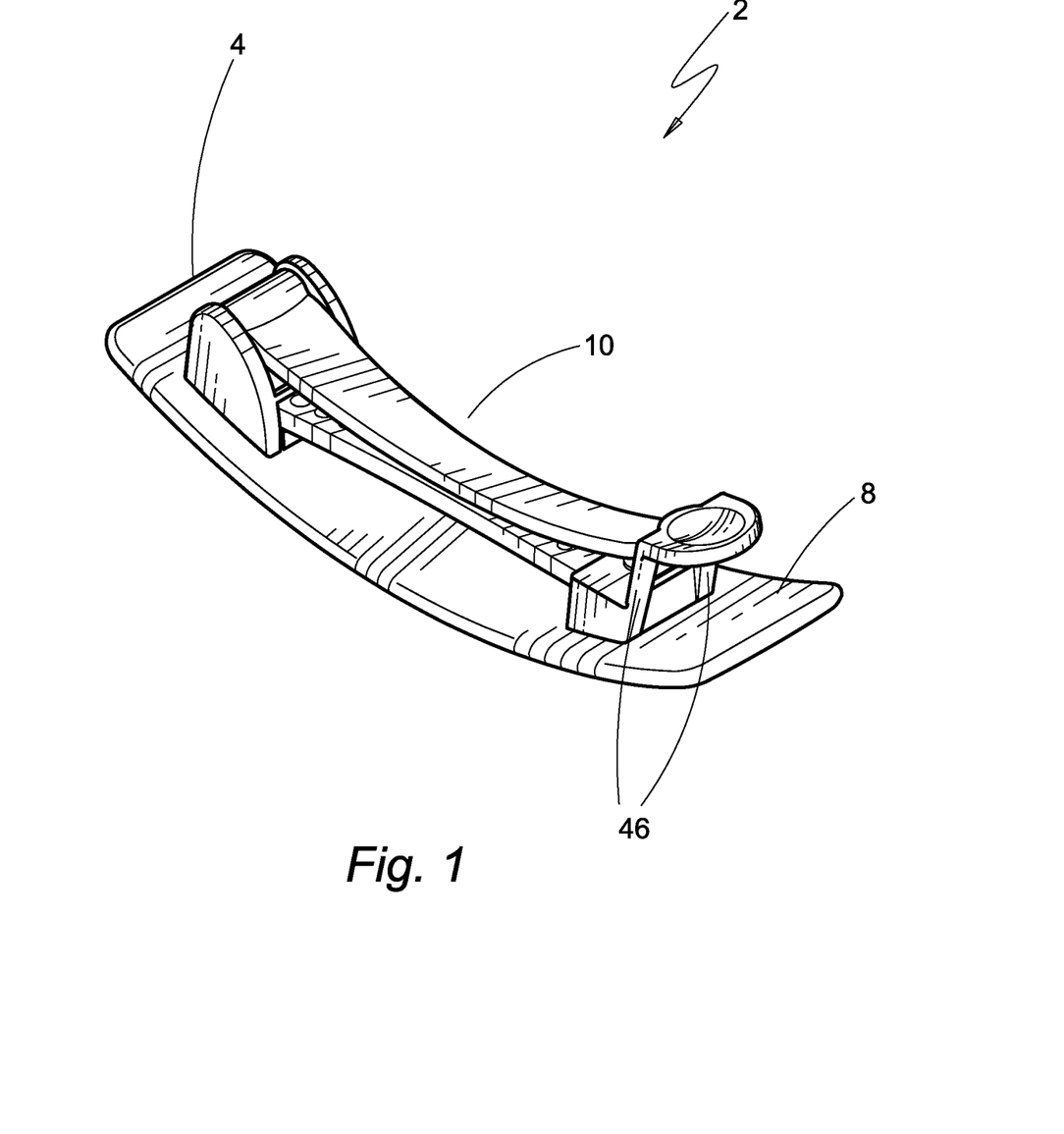
FIG. 1 is a perspective view of an embodiment of a hair barrette in accordance with the present invention.
Figure 2:
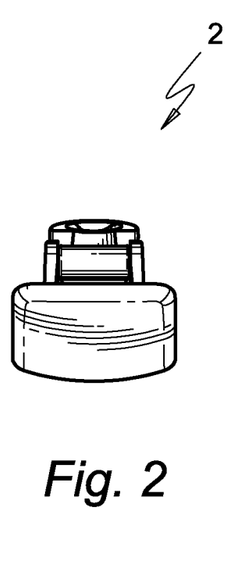
FIGS. 2 and 6 are opposite end views of the hair barrette of FIG. 1.
Figure 3:
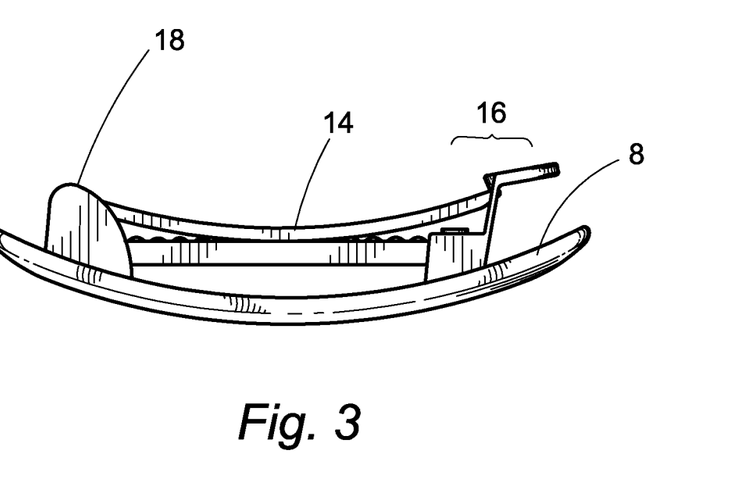
FIGS. 3 and 7 are opposite side views of the hair barrette of FIG. 1.
Figure 4:
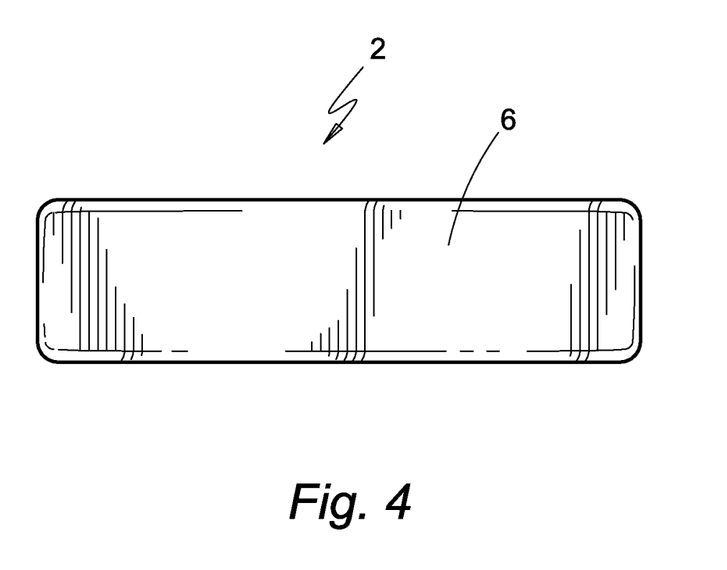
FIG. 4 is a view showing an outwardly facing surface of the hair barrette of FIG. 1.
Figure 5:
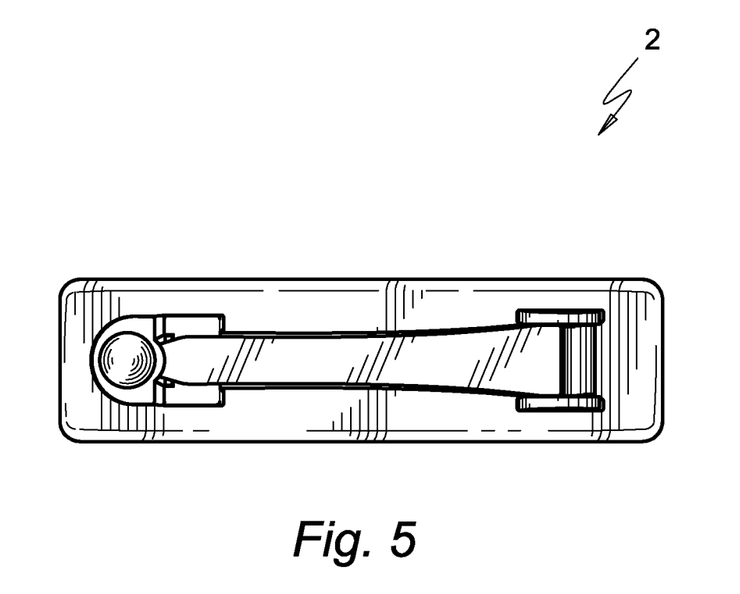
FIG. 5 shows a closure device on the inwardly facing surface of the hair barrette of FIG. 1.
Figure 6:
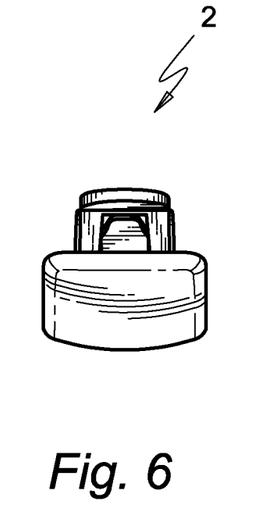
Figure 7:
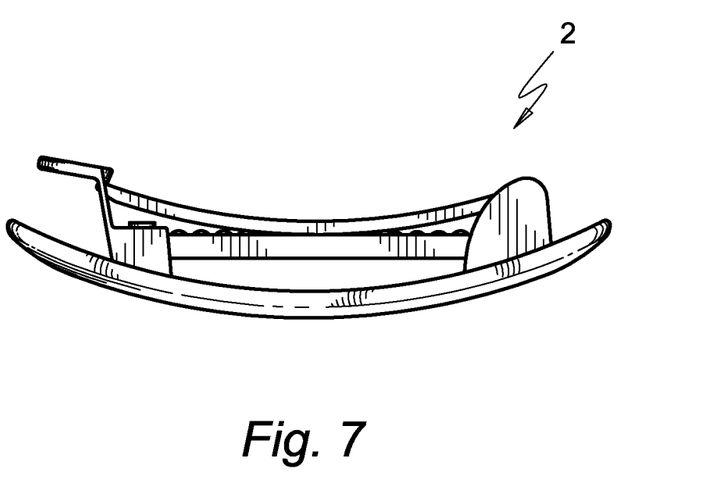

Referring to FIGS. 3 and 7 showing the side views, the closure device 10 generally includes a base member 12 for attachment to the inwardly facing surface 8 of the decorative member 4, and a lever 14. The base member 12 is provided with a first member 16 and a second member 18 disposed at opposite ends thereof. The second member 18 is generally in the form of a seat with a floor 20, upstanding walls 22 extending from the floor 20, with the seat defining a recess 24. The upstanding walls 22 are provided with protrusions 26 on opposite sides thereof. By "upstanding", it refers to the state when the hair barrette 2 is oriented with the outwardly facing surface 6 of the decorative member 4 downwardly facing (i.e. facing the floor) and the inwardly facing surface upwardly facing (i.e. facing away from the floor, again). Please also see FIG. 8.

Figure 8:
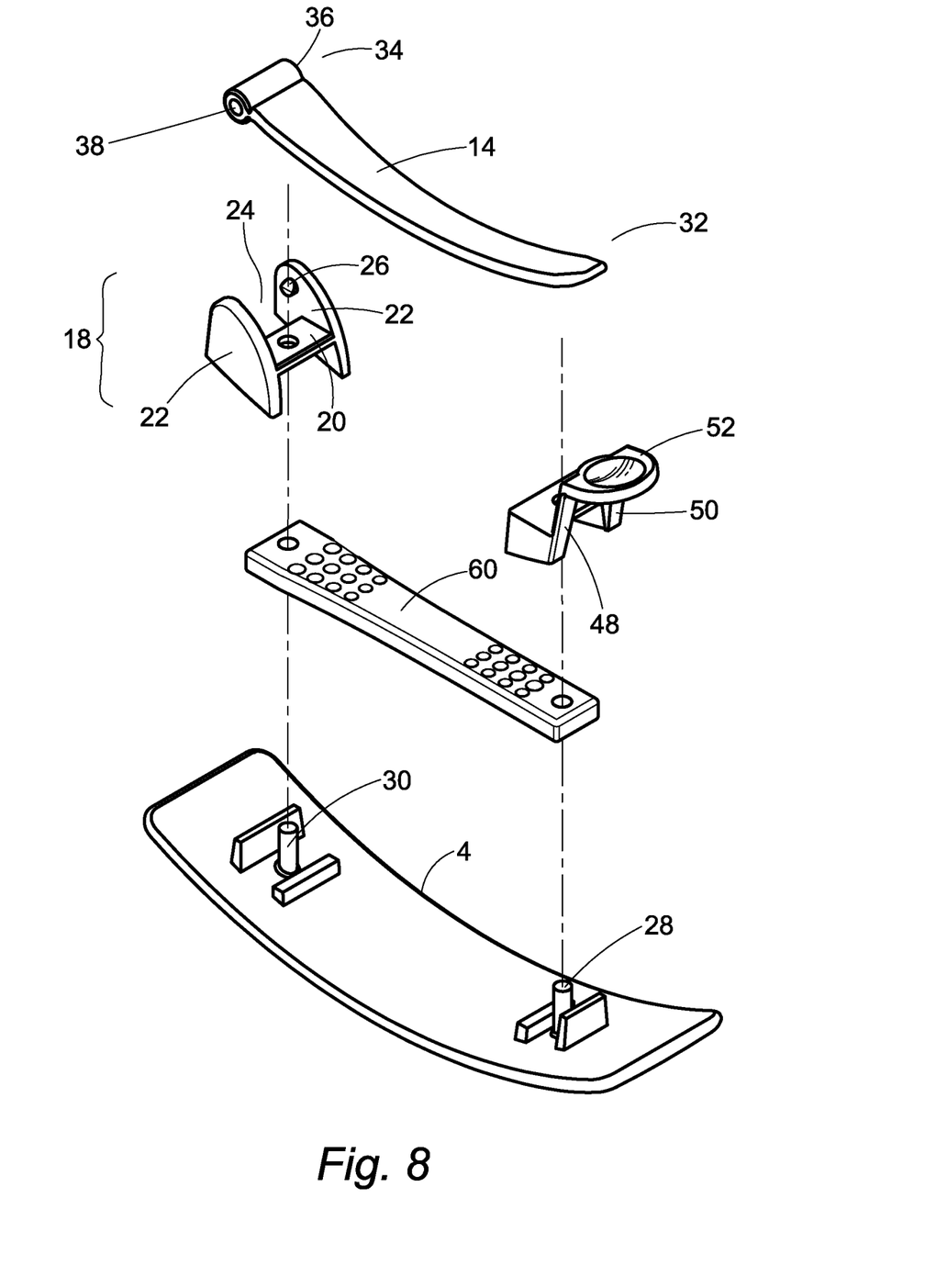
FIG. 8 is an exploded view showing of the hair barrette of FIG. 1.

The second member 18 has several roles, one of which is to act as a point to connection to the decorative member 4. FIG. 8 shows that the inwardly facing surface 8 of the decorative member 4 is provided with a pair of posts, namely a first post 28 and a second post 30, extending away from the inwardly facing surface 8. The posts 28, 30 are integrally formed when the decorative member 4 is formed by way of an/one injection molding step from one plastic(s) material. The second member 18 is provided with an opening at the floor 20 sized and to receive one of the posts. The second member 18 is fixedly secured to the inwardly facing surface 8 at the post 30 either by way of snap fitting and/or welding the second member at the post 30. It is to be noted that there is free of any additional component (e.g. metallic pin or rivet) for securing the second member 18 to the post 30.

The lever 14 also with an elongate profile has opposite ends, namely a first end 32 and a second end 34. The second end 34 is provided with openings 36, 38 oppositely disposed on the lateral sides thereof. The openings 36, 38 are sized and shaped to receive the protrusions 26 in order to allow pivotable movement of the level 14 at the second member 18. It can be envisaged that with this arrangement, the closure device 10 is adapted to assume a first configuration in which the lever 14 is pivotably lowered or a second configuration in which the lever 14 is pivotably raised about a hinge mechanism formed from the second member 18 and the openings 36, 38. In other words, the lever 14 is hingedly movable toward or away from the base member 12.

The first member 16 is provided with an upstanding member 46 assuming the formation of a pair of legs 48, 50. The upstanding member 46 is provided with a lip 52 generally laterally extending from upper ends of the upstanding member 46, with the lip 52 closing the legs 48, 50 thus forming a continuous member in the form of a loop 54. It can thus be understood that the combination upstanding member 46 and lip 52 is in the formation of the continuous member. The continuous member 54 defines a cavity 56 sized and shaped to fit the first end of the lever 32. The continuous member 54 is flexible and on depression towards the inwardly facing surface 8 at the lip 52, the legs 48, 50 are bent away from the second member 18. It can thus be understood that the continuous member 54 can flex away from the second member 18 or the lever 14, or towards the second member 18 or engages the lever 14, determining the flexing position thereof.

The base member 12 includes a bridge member 60 which connects the first and second members 16, 18 and is raised from the inwardly facing surface 8 of the decorative member 4. The bridge member 60 is made of a polymeric material and is extendible in length to 150-300 of its default length, and has a hardness of Shore D30-70. In this embodiment, the material may be silicone although studies leading the present invention also shows that thermoplastic elastomer would also work when the elasticity and the hardness meet the requirements of 30-200% in extendibility and hardness, respectively.

The bridge member 60 is fixedly connected at its opposite ends at the first and second members 16, 18 at the posts 28, 30. In other words, the posts 28, 30 serve to connect all of the bridge member 60 and the first and second members 16, 18 in place.

Figure 9:
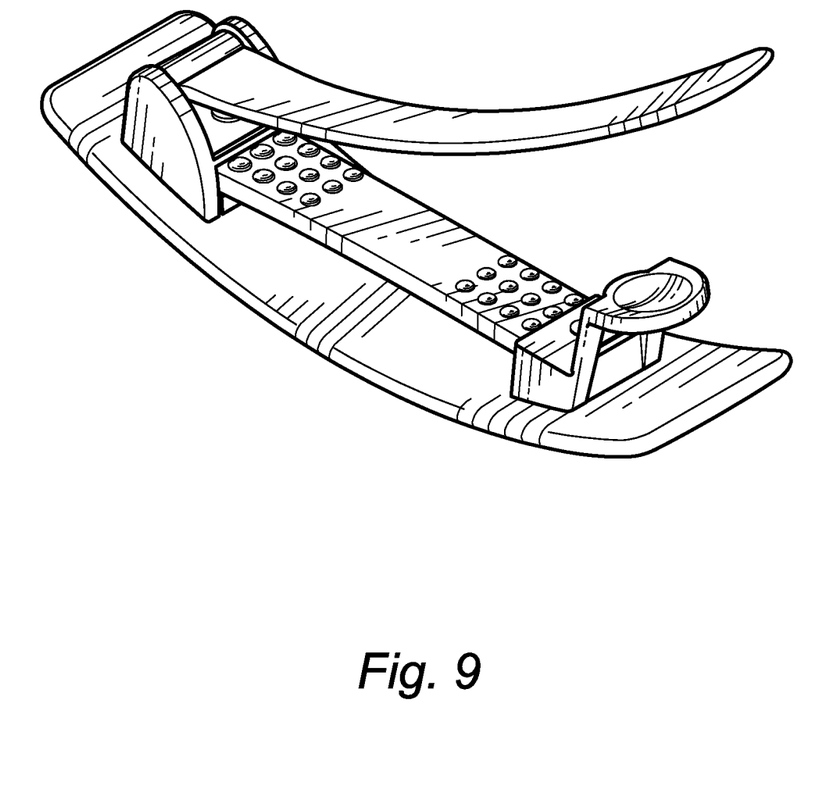
FIG. 9 is perspective view of the hair barrette of FIG. 1 but in an unlocked configuration.

FIG. 9 demonstrates the hair barrette 2 in an unlocked configuration.

Figure 10A:
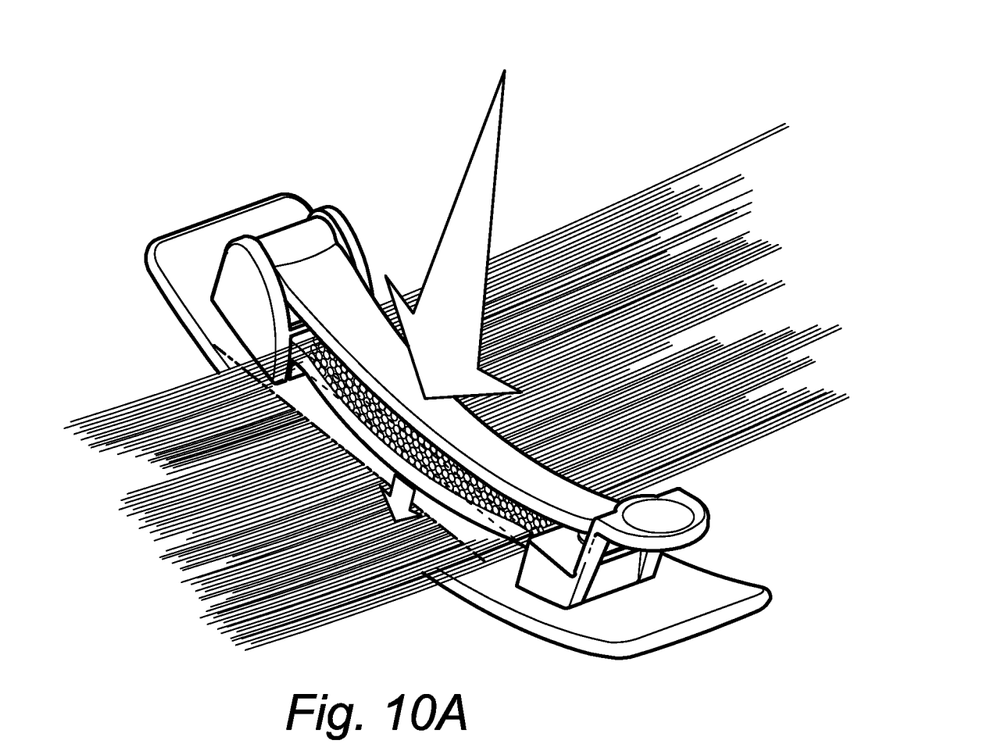
FIGS. 10A and 10B illustrate a locked configuration and an unlocked configuration of the hair barrette of FIG. 1 when used in securing hair of a user.
Figure 10B:
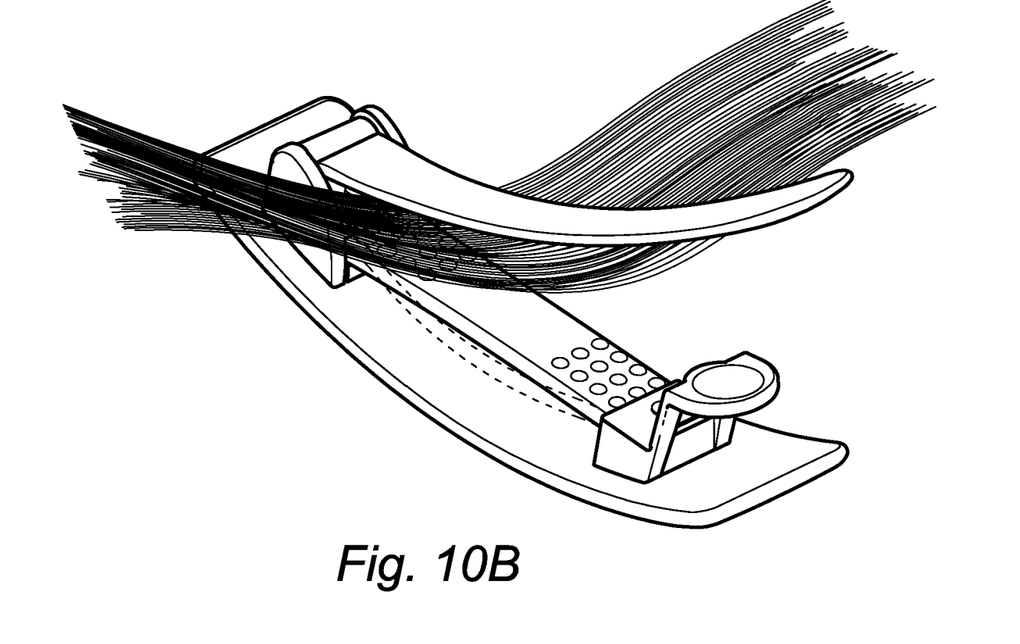

FIGS. 10A and 10B illustrate that when the hair barrette 2 is being worn and as the lever 14 engages the lip 52, the log of hair to be secured presses against the bridge member 60. As explained above, since the bridge member 60 is made of a material that can elongate substantially in length, it can flex away from the lever 14 thus creating significantly more room for the hair to the secured together between the lever 14 and the bridge member 60 by way of its operation during use. Due to the resilience of the bridge member 60, the hair barrette cannot only secure a large log of hair, but also securing it tightly. It is envisaged that when the decorative member has a relatively large concave inwardly facing surface, the clearance between the bridge member and the inwardly facing surface would be larger, and as such the elongatable characteristic of the bridge member will be particular more prominent. FIG. 10B illustrates that in the open configuration a user can position the hair barrette 2 such that a log of hair to be tied is arranged between the lever 14 and the bridge member 60. Once this is achieved, the lever 14 is moved towards the first member 18 for locking as shown in FIG. 10A.

Figure 11A:
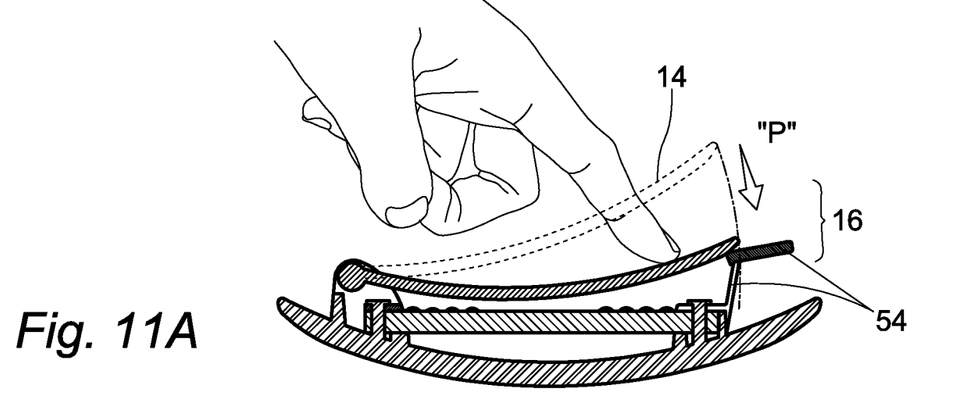
FIGS. 11A to 11D illustrate successive steps of an operation of the hair barrette of FIG. 1 when assuming a locked configuration from a unlocked configuration.

Referring to FIG. 11A, as the lever 14 approaches the first member 16 the lever 14 first approaches an upper side of the lip 52 and then begins to abut the upper side when the continuous member 54 is still in a default, i.e. non-deformed or non-bent, configuration. In this default configuration, the lip 52 is maintained in the position that is in the moving path "P" of the lever 14.

Figure 11B:
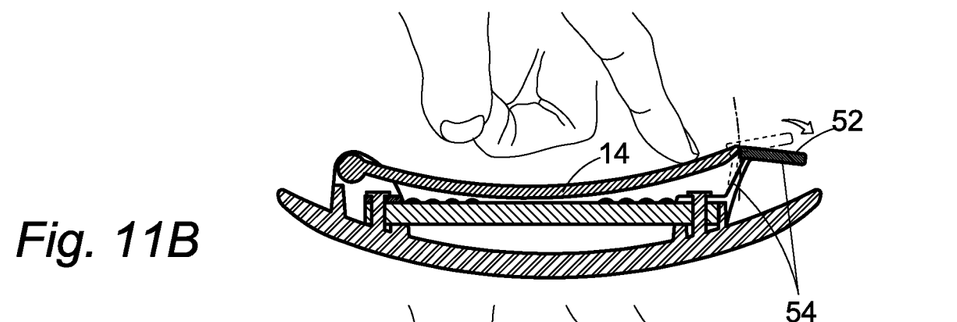
Figure 11C:
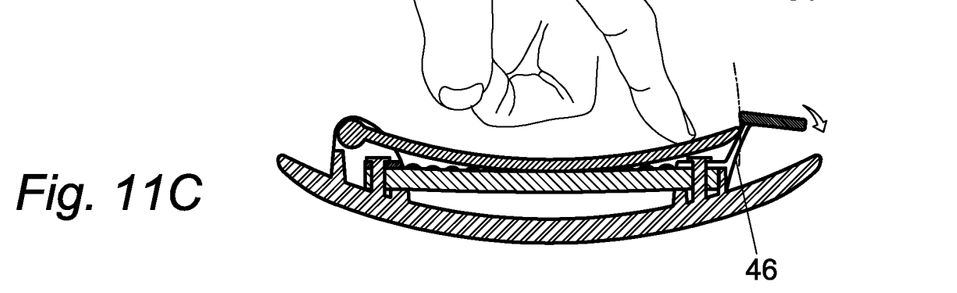

Referring to FIGS. 11B and 11C, further movement of the lever 14 however causes the continuous member 54 to deform with the lip 52 moving outwardly away from the bridge member 60, and the upstanding member 46 bending outwardly correspondingly, thus allowing the lip 52 to move out of the moving path "P" of the lever 14. The extent of the lateral movement of the lip 52 is determined by the width of the lip 52 and the position of the lip 52. When the lip 52 at its default position aligns the lever 14, the extent of movement required is basically the width of the lip 52. With the lip 52 having moved out of the way, the lever 14 is able to travel further in its moving path such that the lever 14 presses against or at least get closer to the bridge member 60. Please see FIG. 10C in particular. The effectiveness of the locking of the lever 14 by the lip 52 can be determined by the length of the lever 14 or the closure device 10. When the lever 14 or the closure device 10 is too long and the lip 52 too narrow, any slight relative movement, or accidental movement, of the lever 14 and the continuous member 54 could undesirably unlock the lever 14 from the continuous member 54.

Figure 11D:
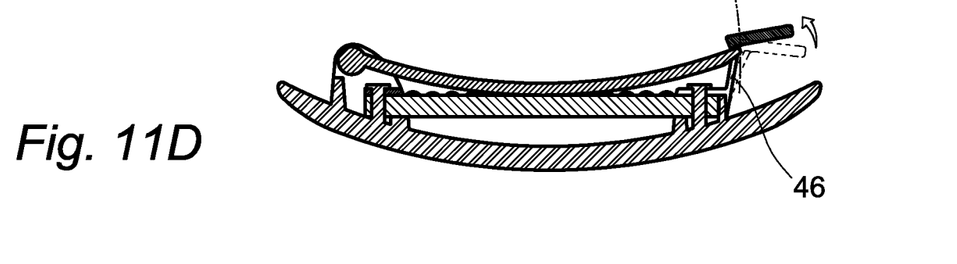

Referring to FIG. 11D, yet further movement of the lever 14 positions the first end of the lever 14 to go passed the lip and eventually to go below the lip. Once the lever 14 has gone passed below the lip, due to the inherent resilience of the continuous member 54 (including the upstanding member 46), the lip 52 flexes back to its original default position with the first end of the lever 14 now positioned below or beneath the lip 52 and secured in the cavity of the continuous member 54.

Figure 12A:
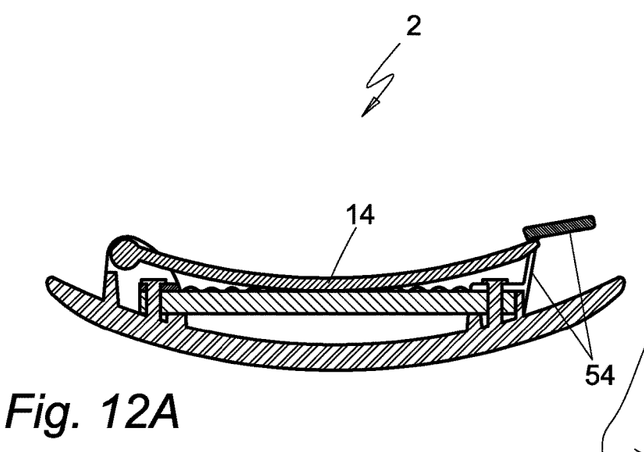
FIGS. 12A to 12C illustrate successive steps of an operation of the hair barrette of FIG. 1 when assuming an unlocked configuration from a locked configuration.

FIG. 12A shows a closed configuration of the hair barrette 2 in which the lever 14 is secured. It is envisaged that the continuous member 54 serves as both a lock for the lever 14 and also an actuator or control for the lock. It can be understood that the closing of the closure device 10 can be achieved by way of a one-hand operation. In other words, the moving of the lever 14 and the decorative member 4 together and the locking of the lever 14 to the continuous member 54 is performed in a single hand manipulative action.

Figure 12B:
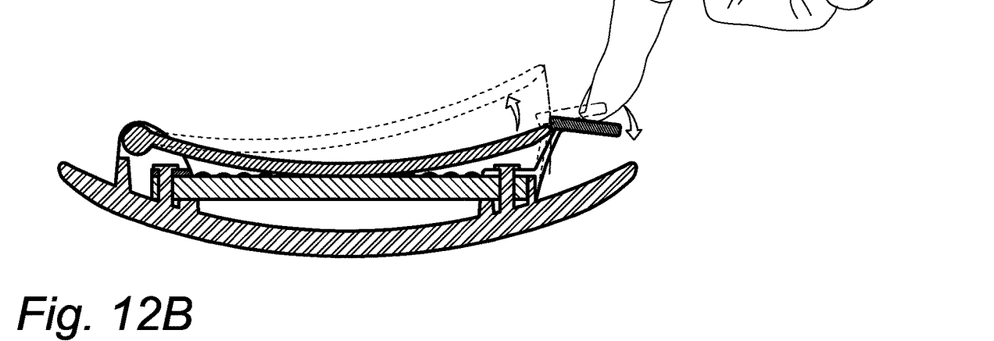
Figure 12C:
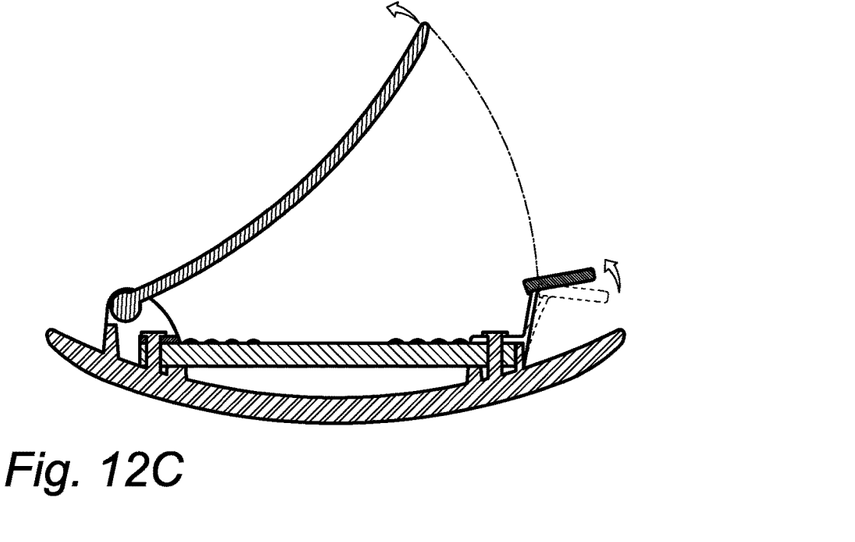

While FIGS. 11A to 11D illustrate how the hair barrette 2 assumes a closed configuration from an opening configuration, FIGS. 12A to 12C illustrate how the hair barrette 2 assumes an open configuration from a closed configuration. Referring to FIG. 12A, when a user desired to remove the hair barrette 2 from use, the lip 52 is moved towards the decorative member 4, for example, by way of using the thumb and the first finger and squeeze the lip 54 towards the decorative member 4. Referring to FIGS. 11B and 11C, the squeezing force causes the continuous member 54 to move away from its default position, causing the lever 14 to disengage from the underside or under surface of the lip 52 and releasing the lever from a locked position.

Referring to FIGS. 10A and 10B, there is shown that the springiness of the bridge member 60 tends to return to its level configuration and thus pushes the lever 14 away so that the lever 14 travels pass the lip 52. Reciprocatingly, the moving of the lever 14 away from the decorative member 4 or the locking of the lever 14 from the continuous member 54 is performed in a single hand manipulative action.

In one embodiment of the present invention, a method of manufacture of the hair barrette includes the steps of:

a) forming a decorative member with an outwardly facing surface and an inwardly facing surface, b) forming a pair of seat members by injection molding, c) forming a bridge member by injection molding, d) assembling the decorative member, the seat members, and the bridge member with opposite distal ends of the bridge member positioned between the seat members and the decorative member, wherein i) the first and second seat members and the lever are made of a first plastic(s) material and the bridge is made from a second plastic(s) material more flexible than the first material, and the bridge member is made of polymeric material and is extendible in length to 150-300% of its default length, and has a hardness of Shore D30-70.

The first and second plastic(s) material are preferably the same material. The third plastic(s) material is different from the first and second plastic(s) material. The hair barrette produced does not include any metallic parts of components.

It is envisaged that hair barrettes produces in accordance the present invention is structural and functionally advantageous in a multi-fold manner. First, there are minimal number of parts involved. For example, in the examples as depicted above, there are only two moving or movable parts, namely, the lever 14 and the continuous member. Second, the closure device, i.e. the entire hair barrette excluding the decorative member, is made of two components, namely the base member 12 and the lever 14. The base member 12 including the first and second seat members are made of one injection molding step using one plastic(s) material. Even when the base member 12 is provided with a cushioning pad for increasing frictional engagement with hair to be tied, the entire base member 12 still is formed from at most two injection molding steps. Further, the assembling of the closure device to the decorative member can be effected without using any metallic rivet means. Finally, the engagement or disengagement of the lever 14 to the continuous member is achieved via a one-hand operation by way of depressing the lip and the decorative member together. The extent of movement of the lip or the force of depression required of the lip is minimal.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

I claim:

1. A hair barrette comprising:
a decorative member defining an outwardly facing surface and an inwardly facing surface; and
a closure device for securing hair of a user,
wherein:
   the closure device includes a lever, a first seat member and a second seat member, the first and second seat members arranged at, and fixedly connected to, the inwardly facing surface of opposite lateral end portions of the decorative member;
   one end of the lever is hingedly connected to the second seat member at which the lever pivotable movably with respect to the decorative member;
   the closure device further includes a singular bridge member laterally extending from and connecting the first seat member and the second seat member and being raised from the inwardly facing surface of the decorative member such that it forms a clearance gap beneath the bridge member that extends fully between the first and second seat members;
   the first seat member comprises a flexible continuous member, the continuous member having: i) an upstanding portion comprising a pair of leg portions that are spaced apart from each other; and ii) a lip portion extending from upper ends of the leg portions and connecting the leg portions to form a closed loop and wherein the lip forms a flat plate portion;
   the closure device is adapted to assume a first configuration with the continuous member in a default position and the lever positioned within the loop, or a second configuration, on depression of the lip, in which the continuous member is flexed laterally away from the second member and the lever is able to rotate past the loop;
   the first and second seat members and the lever are made of a first plastic(s) material and the bridge member is made from a second plastic(s) material that is more flexible than the first plastic material; and
   the bridge member, by virtue of its material property and physical property, is extendible by 150-300%, and has a Shore hardness of D30-70.

2. A hair barrette comprising:
a decorative member defining an outwardly facing surface and an inwardly facing surface; and
a closure device for securing hair of a user,
wherein:
   the closure device includes a lever, a first seat member, and a second seat member, the first and second seat members arranged at, and fixedly connected to, the inwardly facing surface of opposite lateral end portions of the decorative member;

one end of the lever is hingedly connected to the second seat member making the lever pivotable with respect to the decorative member;

the closure device further includes a singular bridge laterally extending from and connected the first seat member and the second seat member and being raised from the inwardly facing surface of the decorative member such that it forms a clearance gap beneath the bridge member that extends fully between the first and second seat members;

the first seat member comprises a flexible continuous member, the continuous member having: i) an upstanding portion comprising a pair of leg portions that are spaced apart from each other, and ii) a lip portion extending from upper ends of the leg portions and connecting the leg portions to form a closed loop, the lip forming a semi-circular plate portion;

the closure device is adapted to assume a first configuration with the continuous member in a default position and the lever positioned within the loop, or a second configuration, on depression of the lip, in which the continuous member is flexed laterally away from the second member and the lever is able to rotated past the loop;

the first and second seat members and the lever are made of a first plastic(s) material and the bridge member is made from a second plastic(s) material that is more flexible than the first plastic(s) material; and the bridge member by virtue of its material property and physical property, is extendible by 150-300% and has a Shore hardness of D30-70.

3. A hair barrette as claimed in claim 1, wherein the first and second seat members are secured to the inwardly facing surface by way of welding thereto.

4. A hair barrette as claimed in claim 3, wherein the inwardly facing surface is provided with protrusions, and wherein a bottom surface of the first and second seat members is provided with complementary recesses for receiving the protrusions, whereby the welding at distal ends of the protrusions fixedly secures the first and second seat members to the decorative member.

5. A hair barrette as claimed in claim 4, wherein the first and second seat members and the inwardly facing surface of the decorative member together defines a pair of slots for accommodating opposite distal ends of the bridge member, and the protrusions are positioned to pass through and secure both the bridge member and the first and second seat members.

6. A hair barrette as claimed in claim 1, wherein the inwardly facing surface has a concave profile, and wherein the hair barrette comprises a pair of levelers connected to the inwardly facing surface on which the first and second seat members rest.

7. A hair barrette as claimed in claim 1, wherein the pair of leg portions of the upstanding portion are slanted laterally away from the second seat member as it extends away from the inwardly facing surface, and wherein the lip is configured as an actuator for controlling configuration of the closure device.

8. A hair barrette as claimed in claim 1, wherein the closure device is free of any metallic components.

9. The hair barrette as claimed in claim 1, wherein the first material is selected from the group consisting of acrylonitrile butadiene styrene (ABS), polypropylene (PP), Parapformaldehyde (POM), nylon, high impact polystyrene (HIPS), thermoplastic polyurethane (TPU), high density polyethylene (HDPE), polyethylene terephthalate (PET), and polylactic acid (PLA).

10. The hair barrette as claimed in claim 9, wherein the second material is selected from the group consisting of silicone and thermoplastic elastomer.

11. The hair barrette of claim 1, wherein the plate portion includes a depression.

* * * * *